United States Patent [19]
Suzuki

[11] Patent Number: 5,825,157
[45] Date of Patent: Oct. 20, 1998

[54] CAMERA USING SOLAR BATTERY

[75] Inventor: Ryoichi Suzuki, Yokohama, Japan

[73] Assignee: Canon Kabushiki Kaisha, Tokyo, Japan

[21] Appl. No.: 829,741

[22] Filed: Mar. 31, 1997

Related U.S. Application Data

[63] Continuation of Ser. No. 667,478, Jun. 2, 1996, abandoned, which is a continuation of Ser. No. 245,423, May 18, 1994, abandoned.

[30] Foreign Application Priority Data

May 21, 1993 [JP] Japan .................................. 5-141243

[51] Int. Cl.⁶ .................................................. H01M 10/46
[52] U.S. Cl. ................................................ 320/30; 320/39
[58] Field of Search .................................. 320/32, 33, 39, 320/43, 49, 61; 136/293, 243, 291; 396/205, 206

[56] References Cited

U.S. PATENT DOCUMENTS

| | | | |
|---|---|---|---|
| 4,328,456 | 5/1982 | Suzuki et al. | 320/7 |
| 4,595,872 | 6/1986 | Ball | 320/13 |
| 5,304,915 | 4/1994 | Sanpei et al. | 320/14 |
| 5,315,228 | 5/1994 | Hess et al. | 320/31 |

FOREIGN PATENT DOCUMENTS

| | | | |
|---|---|---|---|
| 63-91641 | 4/1988 | Japan | G03B 7/26 |
| 6-163965 | 6/1994 | Japan | H01L 31/04 |

*Primary Examiner*—Edward Tso
*Attorney, Agent, or Firm*—Robin, Blecker, Daley and Driscoll

[57] ABSTRACT

There is disclosed a camera having a secondary battery charged by a solar battery, an overcharging prevention circuit for preventing overcharging to the secondary battery, and a control circuit for driving the over-charging prevention circuit when the secondary battery is charged, or a charging device for a camera of this type.

18 Claims, 3 Drawing Sheets

CAMERA USING SOLAR BATTERY

This is a continuation application under 37 CFR 1.62 of prior application Ser. No. 08/667,478, filed Jun. 2, 1996, which is a continuation of Ser. No. 08/245,423, filed May 18, 1994 both abandoned.

BACKGROUND OF THE INVENTION

1. Field of the Invention

The present invention relates to a power source for a camera and, more particularly, to a camera having a power source system using a solar battery and a chargeable unit such as a secondary battery.

2. Related Background Art

In recent years, a large-capacity lithium battery has been used as a power source of a camera. The lithium battery has features such as a large capacity, a small self discharging current, a low internal resistance, and the like, and is best suited for a power source of a camera. However, the lithium battery is quite expensive.

Recently, a rechargeable lithium secondary battery has been put on the market. If this secondary battery is combined with a solar battery, electric power consumed by a camera can be recharged by the solar battery, and a semi-permanent power source system can be provided.

As a rechargeable lithium secondary battery, a lithium-ion battery has been put into practical applications.

The lithium-ion secondary battery has features such as a large capacity, high voltage, and the like. However, since the lithium-ion battery attains an abnormal state when it is charged beyond a predetermined voltage, this battery must be controlled using an overcharging prevention circuit so that the charged voltage does not exceed a predetermined value.

On the other hand, since it cannot be predicted when the solar battery arranged in the camera charges the secondary battery, the overcharging prevention circuit must always be active. However, when the overcharging prevention circuit is always active for this purpose, since the camera is not always active, and instantaneously operates in a release operation, electric power which is not associated with a photographing operation is wasted.

SUMMARY OF THE INVENTION

One aspect of the present invention is to provide a camera which is adapted for using a solar battery, and comprises a chargeable unit charged by the solar battery and charge-related means, such as overcharging prevention means for preventing overcharging of the chargeable unit. Control means is provided for selectively driving the overcharging prevention means upon execution of a charging operation of the secondary battery, wherein only the charging operation from the solar battery to the chargeable unit is to be performed. Thus, only when an overcharging prevention function for the chargeable unit is required, the overcharging prevention means is driven, thereby to prevent waste of power consumption as much as possible, and to also provide an effective charging device for a camera of this type.

Other aspects of the present invention will become apparent from the following detailed description of the preferred embodiments.

DETAILED DESCRIPTION OF THE PREFERRED EMBODIMENTS

Preferred embodiments of the present invention will be described with reference to the accompanying drawings.

The first embodiment of the present invention will be described below with reference to FIG. 1.

Figure 1:
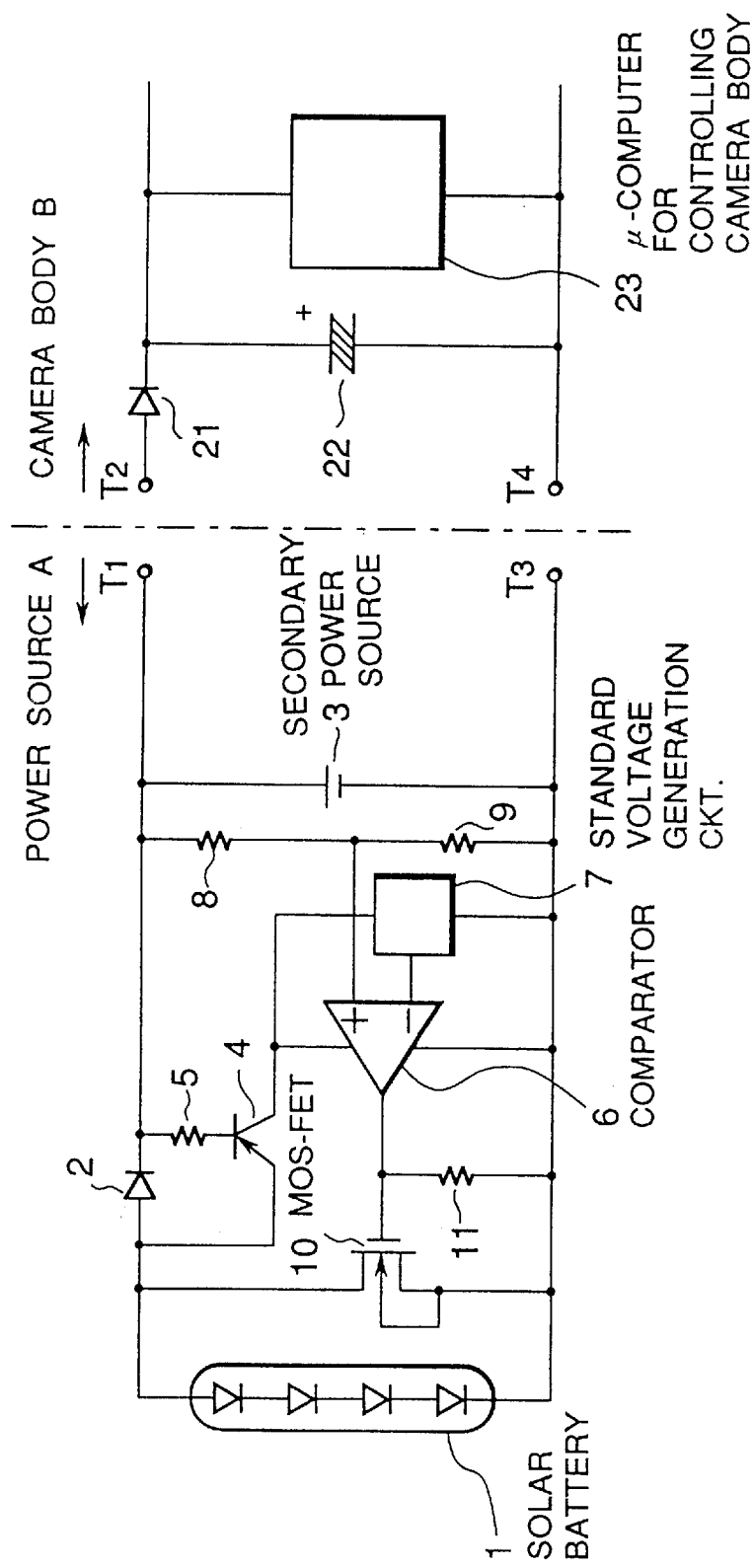
FIG. 1 is a circuit diagram of a camera comprising a solar battery according to the first embodiment of the present invention.

Referring to FIG. 1, a plurality of solar batteries 1 are connected in series with each other, and a reverse-flow prevention diode 2 is connected between the solar batteries 1 and a lithium-ion secondary battery 3 as a chargeable unit. A PNP transistor 4 is used for detecting a charging operation. The emitter of the transistor 4 is connected to the anode of the diode 2, and its base is connected to the cathode of the diode 2 via a resistor 5. Furthermore, the collector of the transistor 4 is connected to a comparator 6 and to a standard voltage generation circuit 7. A series circuit of resistors 8 and 9 is connected in parallel with the secondary battery 3. The non-inverting terminal of the comparator 6 is connected to the node between the resistors 8 and 9, and its inverting terminal is connected to the standard voltage generation circuit 7.

An n-CH type MOS-FET 10 is connected in parallel with the solar batteries 1. The gate of the MOS-FET 10 is connected to the output terminal of the comparator 6, and a resistor 11 is connected in the gate-source path of the MOS-FET 10.

Terminals $T_1$ and $T_3$ are respectively connected to the two electrodes of the secondary battery 3, and are used for connecting terminals $T_2$ and $T_4$ of a camera body B (to be described later).

The above-mentioned components, as a whole, constitute a power source unit A which is detachable from the camera body B.

The camera body B includes the terminals $T_2$ and $T_4$ to be connected to the terminals $T_1$ and $T_3$ of the power source unit A, a reverse-flow prevention diode 21 connected to the terminal $T_2$, a backup capacitor 22 connected between the diode 21 and the terminal $T_4$, and a microcomputer 23, connected in parallel with the capacitor 22, for controlling the camera body.

When the power source unit A is attached to the camera body B, the terminals $T_1$ and $T_2$, and terminals $T_3$ and $T_4$ are respectively connected to each other.

The operation of this embodiment with the above arrangement will be described below.

A case will be described below wherein a charging operation from the solar batteries 1 to the secondary-battery 3 is to be executed. In this case, since the reverse-flow prevention diode 2 is forward-biased, the PNP transistor 4 is turned ON. Therefore, electric power is supplied to the comparator 6 and the standard voltage generation circuit 7.

Assuming that the charged voltage on the secondary battery 3 is low, a voltage obtained by voltage division by the resistors 8 and 9 is lower than the output voltage from the standard voltage generation circuit 7. For this reason, the output from the comparator 6 is kept at low level, and the MOS-FET 10 is kept OFF.

As the charging operation from the solar batteries 1 to the secondary battery 3 progresses, the charged voltage on the secondary battery 3 increases. When the voltage obtained by voltage division by the resistors 8 and 9 exceeds the output level of the standard voltage generation circuit 7 upon the increase in voltage, the output from the comparator 6 is inverted to high level. As a result, the MOS-FET 10 is enabled, and an electromotive current from the solar batteries 1 is short-circuited by the MOS-FET 10, and is not delivered to the secondary battery 3, thereby preventing overcharging.

The resistance ratio between the resistors 8 and 9, and the output level of the standard voltage generation circuit 7 are determined in consideration of the charged voltage level to be subjected to overcharging prevention of the secondary battery 3.

Next, a case will be described below wherein no charging operation from the solar batteries 1 to the secondary battery 3 is performed. In this case, since no forward bias voltage is generated in the reverse-flow prevention diode 2, the PNP transistor 4 is not enabled. Therefore, no electric power is supplied to the comparator 6 and the standard voltage generation circuit 7, and overcharging prevention circuit is not activated.

Figure 2:
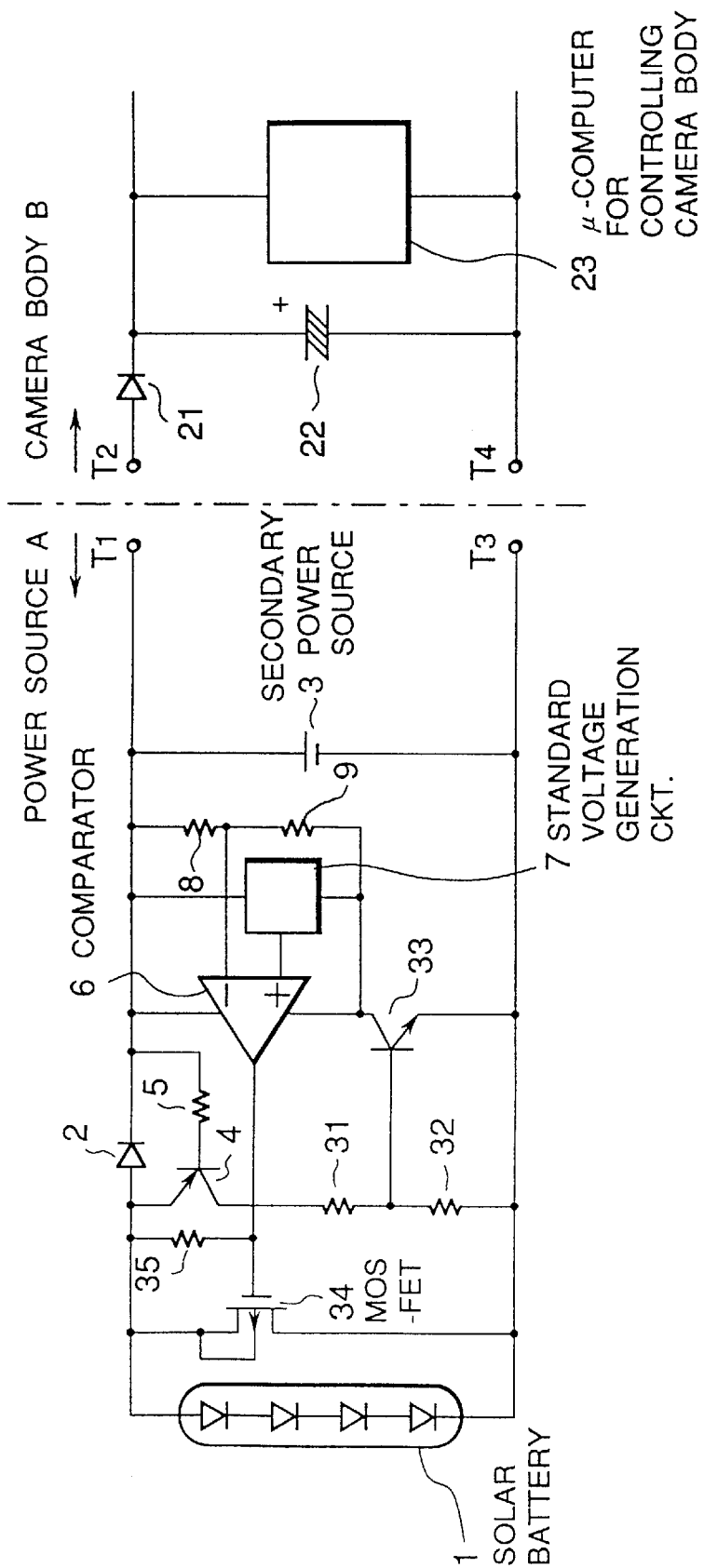
FIG. 2 is a circuit diagram of a camera comprising a solar battery according to the second embodiment of the present invention.

FIG. 2 shows the second embodiment of the present invention. For the sake of simplicity, the same reference numerals in FIG. 2 denote the same parts as in the first embodiment, and only a difference will be explained below.

In this embodiment, a series circuit of resistors 31 and 32 is connected between the collector of the PNP transistor 4 and ground. The comparator 6, the standard voltage generation circuit 7, and an NPN transistor 33, which has a collector connected to the comparator 6 and the generation circuit 7, and an emitter connected to ground, are connected between the two electrodes of the secondary battery 3. The base of the transistor 33 is connected to the node between the resistors 31 and 32. The non-inverting terminal of the comparator 6 is connected to the standard voltage generation circuit 7, and its inverting terminal is connected to the node between the resistors 8 and 9. Furthermore, in place of the MOS-FET 10 of the first embodiment, a p-CH type MOS-FET 34 is connected in parallel with the solar batteries 1. A resistor 35 is connected in the gate-source path of the MOS-FET 34, and the gate of the MOS-FET 34 is connected to the output terminal of the comparator 6. Other arrangements are the same as those in the first embodiment.

The operation of this embodiment with the above arrangement will be described below.

When a charging operation from the solar batteries 1 to the secondary battery 3 is started, since the reverse-flow prevention diode 2 is forward-biased, the PNP transistor 4 is enabled. Therefore, since the NPN transistor 33 is enabled as well, the secondary battery 3 supplies electric power to the comparator 6, the standard voltage generation circuit 7, and the resistors 8 and 9.

When the charged voltage on the secondary battery 3 is low, since the voltage obtained by voltage division by the resistors 8 and 9 is also lower than the output voltage from the standard voltage generation circuit 7, the output from the comparator 6 is kept at high level, and the MOS-FET 34 is kept OFF.

As the charging operation from the solar batteries 1 to the secondary battery 3 progresses, and the charged voltage on the secondary battery 3 increases, the voltage obtained by voltage division by the resistors 8 and 9 becomes higher than the standard voltage, and the output from the comparator 6 is inverted to low level. As a result, since the potential at the gate of the MOS-FET 34 goes to low level, the MOS-FET 34 is enabled, and the solar batteries 1 are short-circuited. With this operation, the overcharging phenomenon of the secondary battery 3 can be prevented.

When no charging operation from the solar batteries 1 to the secondary battery 3 is performed, the reverse-flow prevention diode 2 is not forward-biased, and the transistor 4 is kept OFF. Therefore, the NPN transistor 33 is also kept OFF, and no electric power is supplied to the comparator 6, the standard voltage generation circuit 7, and the resistors 8 and 9. In this state, since the gate of the p-CH type MOS-FET 34 is pulled up by the resistor 35, the MOS-FET 34 is kept OFF. Therefore, an overcharging prevention circuit is not activated.

In the first embodiment, when the electromotive current from the solar batteries 1 is small, a current to be consumed by the overcharging prevention circuit cannot often be sufficiently supplied. However, in this embodiment, such a problem can be solved since electric power is supplied from the secondary battery.

In the first embodiment, since the voltage-dividing resistors 8 and 9 are directly connected in parallel with the secondary battery 3, electric power is always consumed by these resistors. However, in this embodiment, this problem can be solved since the resistors are connected in parallel with the secondary-battery 3 by the transistor 33 in only a charging operation.

Figure 3:
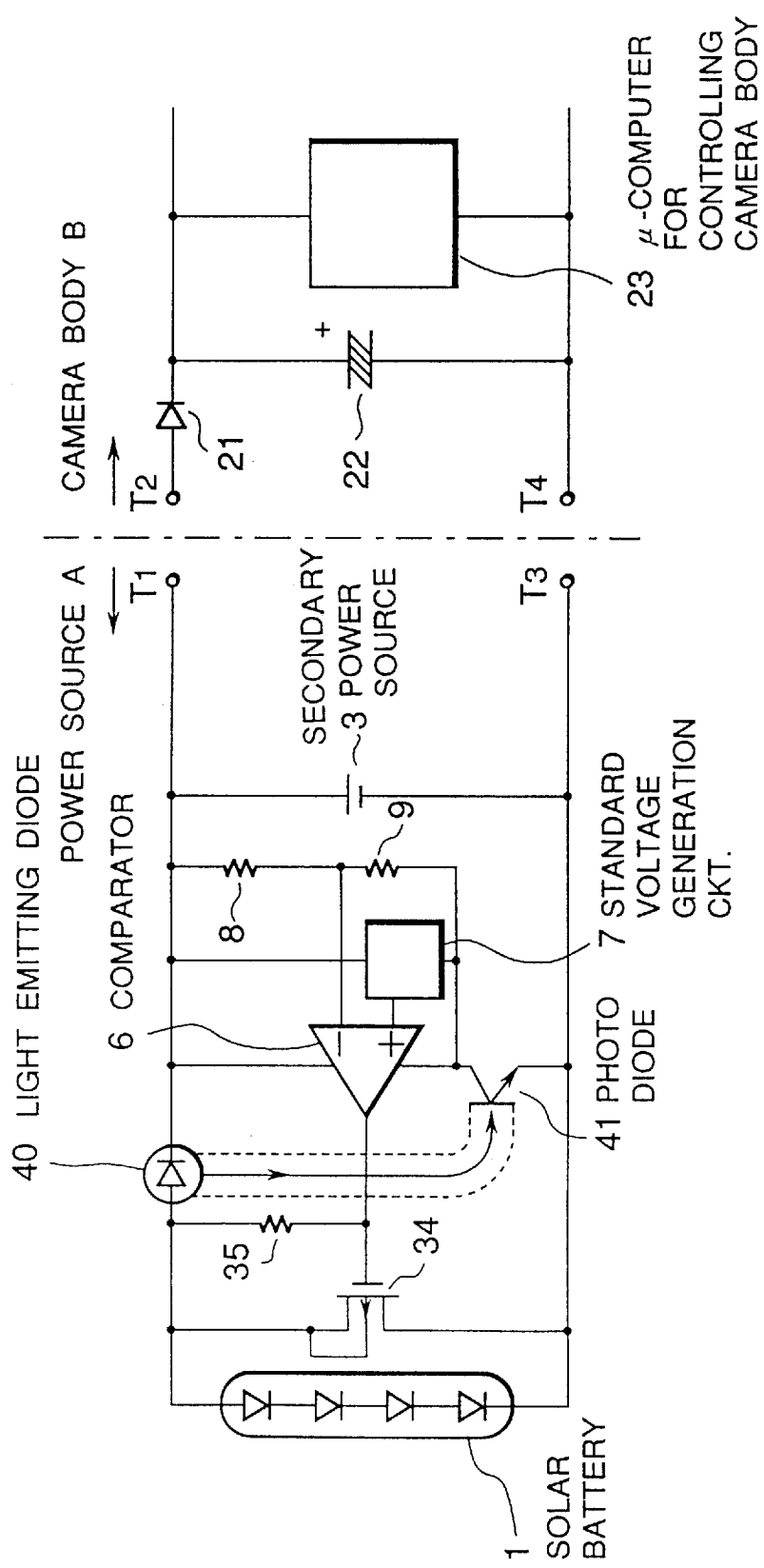
FIG. 3 is a circuit diagram of a camera comprising a solar battery according to the third embodiment of the present invention.

FIG. 3 shows the third embodiment of the present invention. For the sake of simplicity, the same reference numerals in FIG. 3 denote the same parts as in the second embodiment, and only a difference will be described below.

In this embodiment, in place of the diode 2, the transistor 4, the resistors 5, 31, and 32, and the NPN transistor 33 in the second embodiment, a light emitting diode 40 is connected between the solar batteries 1 and the secondary battery 3. The emitter of a phototransistor (photodiode) 41 is grounded, and its collector is connected to the standard voltage generation circuit 7 and the resistors 8 and 9. The phototransistor 41 is arranged at a position where it can receive a light beam emitted from the light emitting diode 40. Other arrangements are the same as those in the second embodiment.

The operation of this embodiment with the above arrangement will be described below.

When a charging operation from the solar batteries 1 to the secondary battery 3 is performed, a charging current to the secondary battery 3 turns on the light emitting diode 40. For this reason, the phototransistor 41 is turned on by the light emitted from the diode 40. As a result, electric power is supplied from the secondary battery 3 to the comparator 6, the standard voltage generation circuit 7, and the resistors 8 and 9.

When the charged voltage on the secondary battery 3 is still low, since the voltage obtained by voltage division by the resistors 8 and 9 is lower than the standard voltage, the output from the comparator 6 is kept at high level, and the MOS-FET 34 is kept OFF.

As the charging operation from the solar batteries 1 to the secondary battery 3 progresses, and the charged voltage on the battery 3 increases, the voltage obtained by voltage division by the resistors 8 and 9 becomes higher than the standard voltage, and the output from the comparator 6 is inverted to low level. As a result, the MOS-FET 34 is enabled, the solar batteries 1 are short-circuited, and the charging operation to the secondary battery 3 is stopped, thereby preventing overcharging.

When no charging operation from the solar batteries 1 to the secondary battery 3 is performed, since the light emitting diode 40 is not energized, the light emitting diode 40 is not turned on. Therefore, the phototransistor 41 is kept OFF, and no electric power is supplied to the comparator 6, the standard voltage generation circuit 7, and the resistors 8 and 9. Since the gate of the p-CH type MOS-FET 34 is pulled up by the resistor 35, the MOS-FET 34 is kept OFF. Therefore, an overcharging prevention circuit is not activated.

In each of the above-mentioned embodiments, a lithium-ion battery is used as the secondary battery. However, the present invention is not limited to this, and can be applied to all other secondary batteries, and further, to chargeable units for which overcharging must be prevented.

The present invention can be applied to a case wherein a power source other than the solar battery is used.

Furthermore, the present invention can be applied to equipment other than a camera.

Moreover, the embodiments of the present invention or their technical elements may be combined as needed.

The individual components shown in schematic or block form in the Drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A charging apparatus adapted for using a solar battery for a camera comprising:
   (A) a chargeable unit charged by the solar battery;
   (B) an overcharging prevention device which prevents overcharging to said chargeable unit; and
   (C) a detection device which detects an overcharging state and actuates said overcharging prevention device, said detection device not being fed by said chargeable unit at least whenever said chargeable unit is not being charged.

2. A charging apparatus according to claim 1, wherein said overcharging prevention device comprises an overcharging prevention circuit.

3. A charging apparatus according to claim 1, wherein said detection device comprises a control circuit.

4. A device according to claim 1, wherein said chargeable unit comprises a lithium battery.

5. A charging apparatus according to claim 1, wherein said detection device comprises a driving device which drives said overcharging prevention device in response to the charging operation started by said solar battery.

6. A charging apparatus according to claim 1, wherein said overcharging prevention device comprises a short-circuiting device which short circuits the solar battery.

7. A charging apparatus according to claim 1, wherein said detection device comprises a further device which causes the solar battery to drive said overcharging prevention device.

8. A charging apparatus according to claim 1, wherein said detection device comprises a further device which causes said chargeable unit to drive said overcharging prevention device.

9. A charging apparatus adapted for using a solar battery, comprising:
   (A) a chargeable unit charged by the solar battery;
   (B) an overcharging prevention device which prevents overcharging to said chargeable unit; and
   (C) a detection device which detects an overcharging state and actuates said overcharging prevention device, said detection device not being fed by said chargeable unit at least whenever said chargeable unit is not being charged.

10. A charging apparatus according to claim 9, wherein said detection device comprises a driving device which drives said overcharging prevention device in response to the charging operation started by the solar battery.

11. A charging apparatus according to claim 9, wherein said apparatus comprises a camera.

12. A charging apparatus for a camera, comprising:
   (A) a solar battery;
   (B) a chargeable unit charged by said solar battery;
   (C) an overcharging prevention device which prevents overcharging to said chargeable unit; and
   (D) a detection device which detects an overcharging state and actuates said overcharging prevention device, said detection device not being fed by said chargeable unit at least whenever said chargeable unit is not being charged.

13. A charging apparatus according to claim 12, wherein said detection device comprises a driving device which drives said overcharging prevention device in response to the charging operation started by said solar battery.

14. A charging apparatus for a camera, comprising:
   (A) a chargeable unit charged by a power source;
   (B) an overcharging prevention device which prevents overcharging to said chargeable unit; and
   (C) a detection device which detects an overcharging state and actuates said overcharging prevention device, said detection device not being fed by said chargeable unit at least whenever said chargeable unit is not being charged.

15. A charging apparatus according to claim 14, wherein said detection device comprises a driving device which drives said overcharging prevention device in response to the charging operation started by said power source.

16. A charging apparatus comprising:
   (A) a chargeable unit charged by a power source;
   (B) an overcharging prevention device which prevents overcharging to said chargeable unit; and
   (C) a detection device which detects an overcharging state and actuates said overcharging prevention device, said detection device not being fed by said chargeable unit at least whenever said chargeable unit is not being charged.

17. A charging apparatus according to claim 16, wherein said detection device comprises a driving device which drives said overcharging prevention device in response to the charging operation started by the power source.

18. A charging apparatus according to claim 16, wherein said apparatus comprises a camera.

* * * * *

UNITED STATES PATENT AND TRADEMARK OFFICE
CERTIFICATE OF CORRECTION

PATENT NO. : 5,825,157
DATED : October 20, 1998
INVENTOR(S) : Ryoichi Suzuki

It is certified that error appears in the above-identified patent and that said Letters Patent is hereby corrected as shown below:

Title page, [63], line 1, delete "Jun. 2, 1996" and insert --Jun. 24, 1996--.
Column 1, line 4, delete "Jun. 2, 1996" and insert --Jun. 24, 1996--.
Column 3, line 21, after "and" insert --the--.

Signed and Sealed this

Twenty-seventh Day of July, 1999

Attest:

Q. TODD DICKINSON

*Attesting Officer*     *Acting Commissioner of Patents and Trademarks*